United States Patent [19]
Kelm-Kläger et al.

[11] Patent Number: 6,012,329
[45] Date of Patent: Jan. 11, 2000

[54] METHOD AND APPARATUS FOR TESTING TIRES ON A MOTOR DRIVEN ROLLER SET

[75] Inventors: Ronald Kelm-Kläger, Landsberg/Lech; Hermann Bux, Adelzhausen, both of Germany

[73] Assignee: Beissbarth GmbH, Germany

[21] Appl. No.: 09/093,890

[22] Filed: Jun. 9, 1998

[30] Foreign Application Priority Data

Jun. 10, 1997 [DE] Germany .............................. 197 24 463

[51] Int. Cl.⁷ ................................................. G01M 17/02
[52] U.S. Cl. .................................. 73/146; 73/117; 73/123
[58] Field of Search ............................... 73/146, 117, 123

[56] References Cited

FOREIGN PATENT DOCUMENTS

| | | |
|---|---|---|
| 0 315 099 A2 | 5/1989 | European Pat. Off. . |
| 0 785 421 A2 | 7/1997 | European Pat. Off. . |
| 36 24 589 A1 | 1/1988 | Germany . |
| 39 04 122 C2 | 5/1991 | Germany . |
| 42 12 426 C1 | 7/1993 | Germany . |
| 42 31 578 A1 | 3/1994 | Germany . |
| 44 42 980 A1 | 6/1996 | Germany . |
| 195 01 073 A1 | 8/1996 | Germany . |
| 195 44 661 A1 | 6/1997 | Germany . |
| 5-126686 | 5/1993 | Japan . |
| 5-264407 | 10/1993 | Japan . |

*Primary Examiner*—Joseph L. Felber
*Attorney, Agent, or Firm*—Crompton, Seager & Tufte

[57] ABSTRACT

In the tire examination method before and after an alteration in the tire pressure a respective interferogram is produced of the tire surface using coherent radiation and the interferogram is converted into a modulo 2 π image, which for its part is processed to obtain a gray value image and in the case of which from a comparison of the gray value images information concerning any defects present in the tire is obtained. For testing a tire the wheel, which bears such tire to be tested, is arranged on a driven roller set by driving the vehicle with the wheel, a test head is moved toward the tire to be at a predetermined test distance therefrom for producing such interferograms, at a first test segment of the tire examination for defects is performed, the wheel is incrementally rotated by the roller set by an amount equal to the size of a test segment and so many test segments are examined that the complete tire is tested. The tire testing apparatus possesses an air pressure means for altering the tire pressure, a test head and a computer.

35 Claims, 4 Drawing Sheets

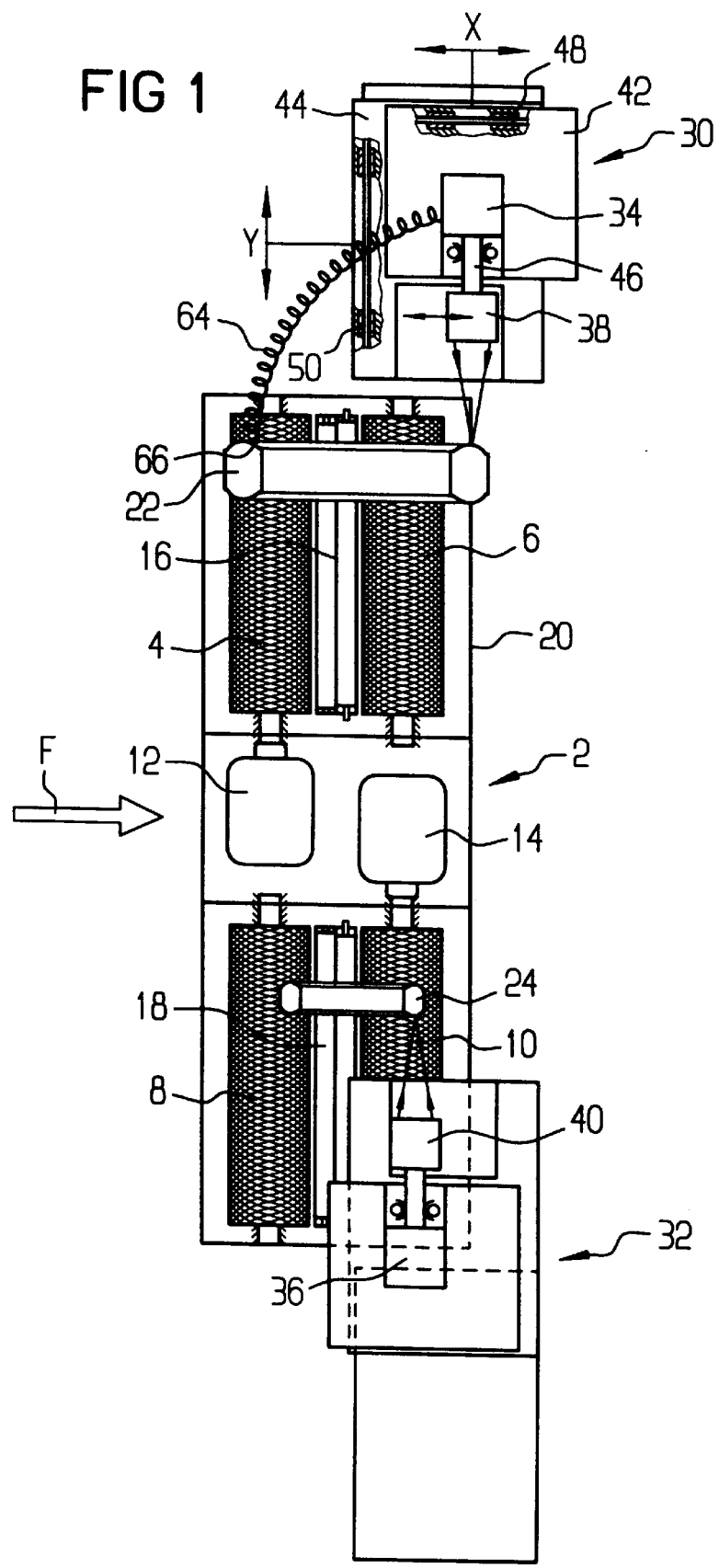

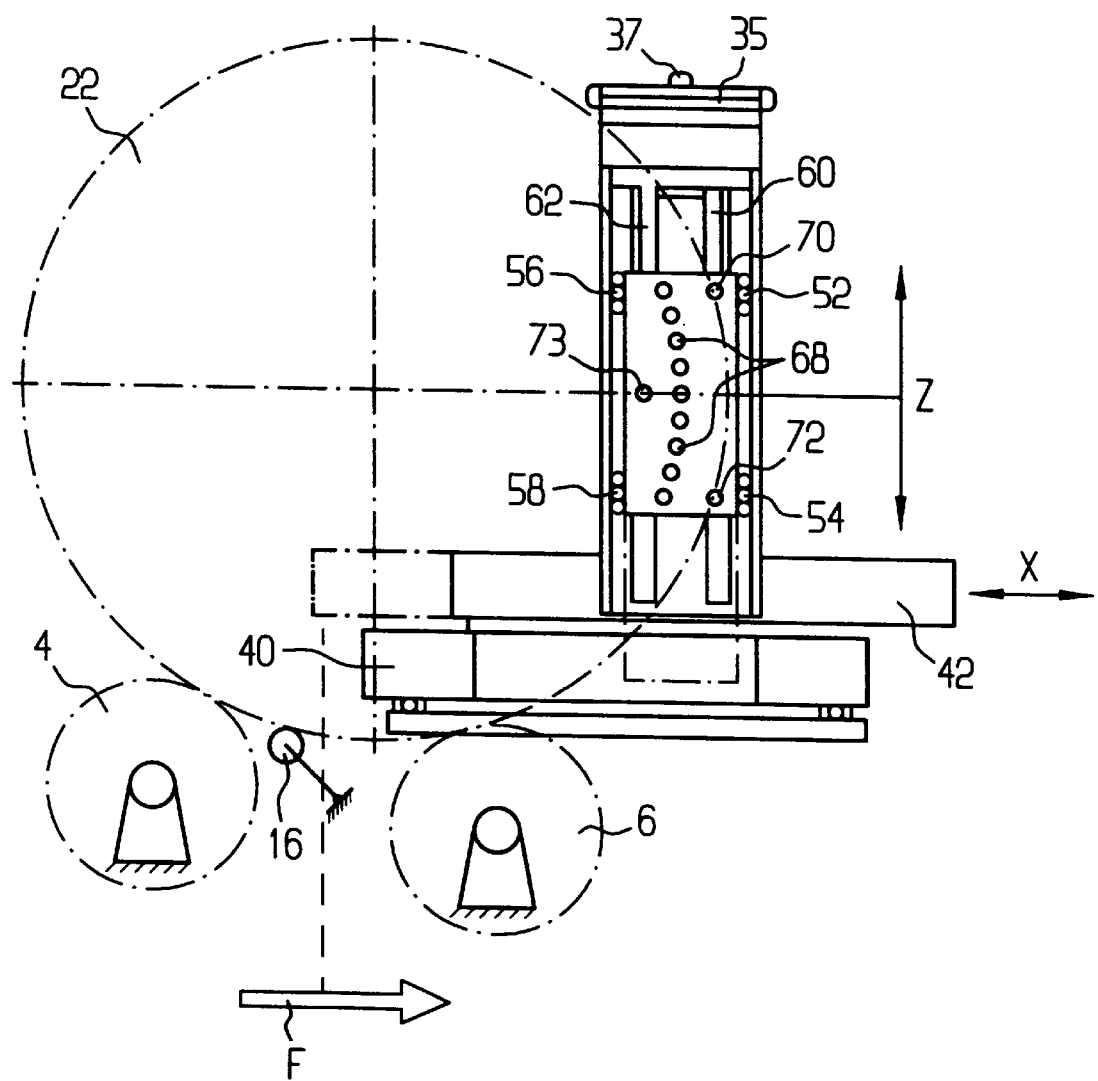

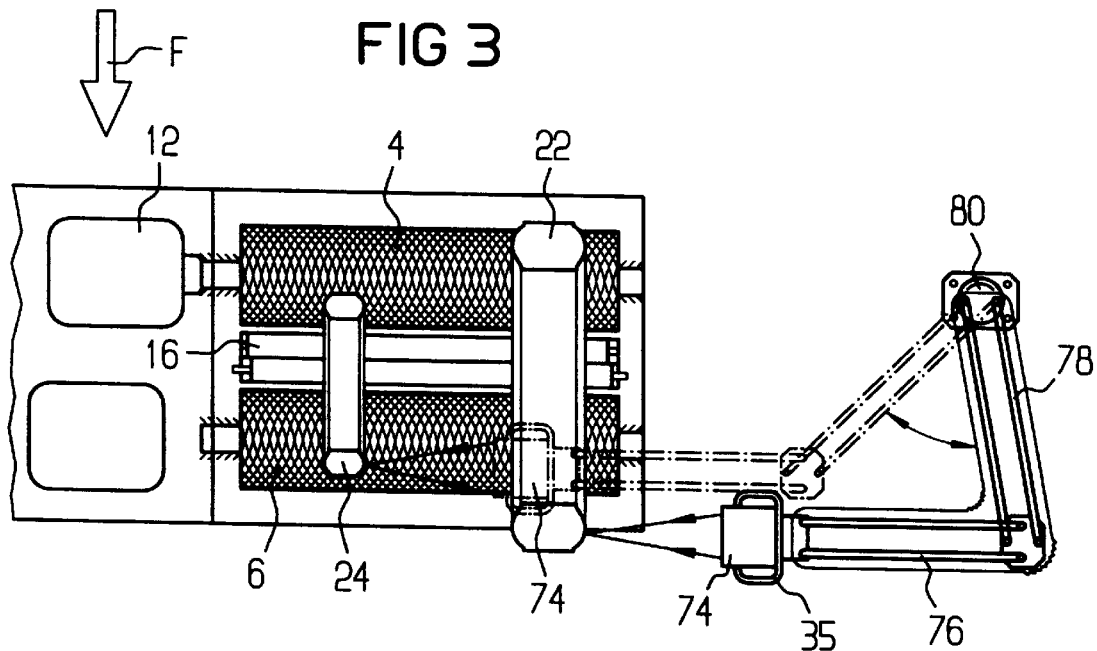
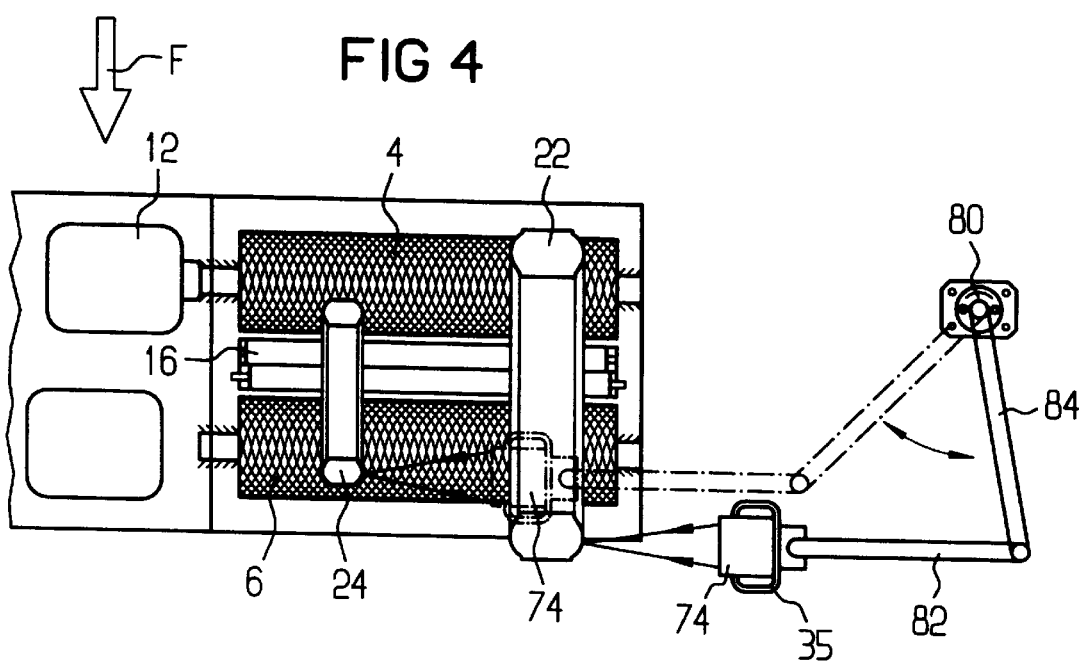

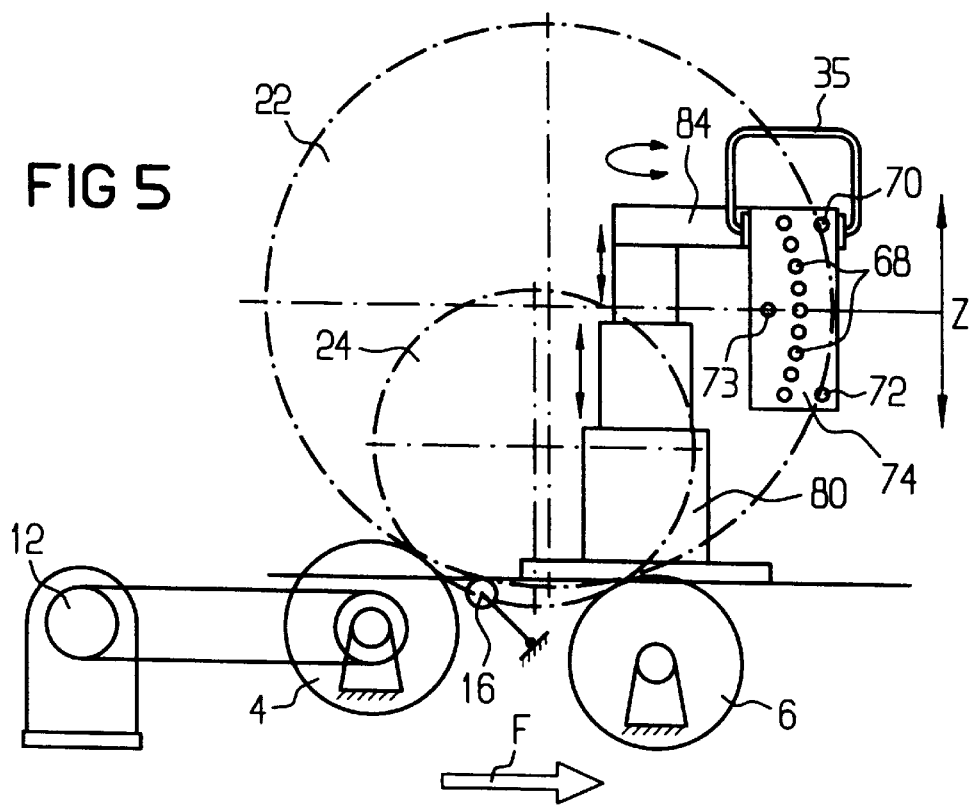
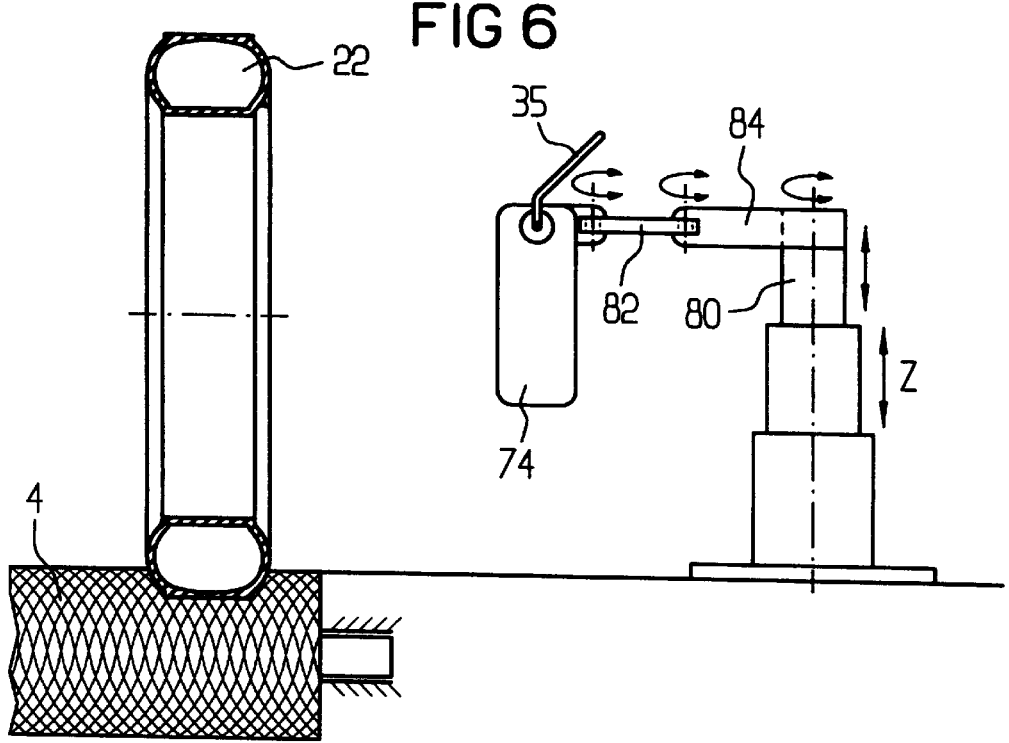

METHOD AND APPARATUS FOR TESTING TIRES ON A MOTOR DRIVEN ROLLER SET

BACKGROUND OF THE INVENTION

The invention relates to a method of testing tires, wherein before and after an alteration in the tire pressure a respective interferogram is produced of the tire surface using coherent radiation and the interferogram is converted into a modulo $2\pi$ image, which for its part is processed to obtain a gray value image and in the case of which from a comparison of the gray value images information concerning any defects present in the tire is obtained, and furthermore to an apparatus for the performance of the method.

The German patent publication 42 31 578 A1 discloses a method for the determination of the structural strength of tires, in which the tire is illuminated with coherent light, the radiation diffusely reflected back from the tire is divided up in a twin beam interferometer into two beam parts, in the twin beam interferometer one of the two beam parts is tilted in relation to the other beam part as a shearing operation, in the twin beam interferometer one of the two beam parts is phase shifted in steps, the radiation diffusely reflected by the object being tested and split up into two beam parts and then united again is returned through components presenting an image of the surface of the tire with a large aperture to an electronic image sensor system and the signals produced by the image sensor system are digitalized and further processed to give a modulo $2\pi$ image and the modulo $2\pi$ image is confirmed as an output gray value image.

In accordance with the German patent publication 195 02 073 A1 the above mentioned method is further developed to the extent that the output gray value image is partially differentiated, a second gray value image identical to the output gray value image is produced and it is geometrically displaced in the shearing direction in relation to the output gray value image and is altered by a gray value which is constant over the entire image area and the second gray value image manipulated in this manner is subtracted from the output gray value image and so that a resulting gray value image is produced, from which any defects in the tire may be seen.

When it is considered that structural damage in tires and more particularly in the carcass including the belt, may in the case of car tires substantially impair the safety of the vehicle, it will be seen to be desirable for a device to be available able to perform tire testing.

SUMMARY OF THE INVENTION

One object of the invention is to create a tire testing method and apparatus rendering possible large scale testing of tires on a motor vehicle, more especially as part of a general technical examination of the vehicle.

For this purpose in the method in accordance with the invention for the examination of a tire on a motor vehicle the motor vehicle with the wheel mounting the tire to be tested is driven onto a set of rollers, a test head for producing such interferograms is moved toward the tire so as to be at a predetermined distance therefrom, the examination for defects is performed on a first test segment of the tire, the wheel is rotated incrementally by the set of rollers by an amount equal to the size of a test segment, and the two last mentioned steps are repeated until the entire tire has been tested.

The costs of the test head are substantially dependent on the area, which may be covered in a single measuring step. Consequently the expense due to the test head may be substantially reduced to the extent that segmentwise measurement of the tire is provided for, wherein a plurality of test segments on the tire are brought into the field of view of the test head one after the other. It is therefore desirable to rotate the tire incrementally to expose the test segments of the tire one after another. In the case of the German patent publication 42 31 578 A1, the wheel is mounted on a rotating shaft of a machine which is exclusively designed for the tire testing procedure, and the tire is not biased or influenced by an external force during rotation and testing thereof. As the desired deformation of the tire for the tire testing procedure can, according to the German patent publication 42 31 578 A1, also be effected by squeezing the tire, one would think that when the tire is squeezed during rotation on a roller set, the effect of squeezing the tire and the effect of the alteration in the tire pressure during the tire testing procedure would influence each other to the effect that the test results are not reliable. However, surprisingly enough, the test results are good and reproducable in spite of the fact that the tire is rotated on a roller set while still being mounted on the vehicle. Furthermore, it could be verified, surprisingly enough, that the forces applied to the tire by the vehicle does not adversely influence the test results.

An advantageous development of the invention is characterized in that between the incremental rotation of the wheel and activation of the test head for examination of a test segment a quiescent recovery time interval of predetermined duration is allowed to elapse. This ensures that the tire may come to rest prior to further rotation which improves the accuracy of measurement.

In the case of a further advantageous embodiment of the invention the drive motor of the roller set is operated by a computer via a frequency converter and more especially the incremental rotation of the wheel is measured and a corresponding input signal fed to the computer. This ensures that the wheel may be reliably incrementally rotated exactly by the required amount without the structural complexity being unnecessarily increased.

In accordance with a further advantageous development of the method the size data necessary for the further rotation of the wheel, as for example the tire size, are supplied to the computer or obtained from a table in the computer. If the size data are held in the form of a table, it is possible for such table to be continuously supplemented by manual inputs so that there is the advantage that setting up the apparatus for testing becomes steadily simpler.

An advantageous further development of the method of the invention is characterized in that the test head is moved in the X, Y and Z direction in order to bring the same into the test position for different tires. This renders the method adaptable as regards the tire types which may be tackled.

A further advantageous development of the method in accordance with the invention is characterized in that during the approach movement of the test head its distance from the tire is monitored and an indication is displayed, when the test head has reached its intended position and the test head is then arrested. This means that a safe, rapid and exact setting of the test head in relation to the tire is possible.

A further advantageous development of the method in accordance with the invention is characterized in that the tire pressure is reduced by one pressure step for each test step and after testing has been completed it is returned to the nominal pressure. By following this method, the changing of the tire pressure during a whole testing cycle wherein the test sectors are measured one after the other, may be carried out with minimum time loss as the pressure change from a first testing step to a second testing step starts from the end pressure present at the end of the first testing step. Furthermore, after each squeezing action during rotation and after each pressure change, the tire has to rest for a certain period of time, so that the test results are not influenced by ongoing movements due to the pressure change. Therefore, the time consumed for such recovery time periods is minimized if the number of pressure changes made during a test cycle is brought to a minimum. The number of recovery time periods would increase if the tire pressure would be brought up to nominal pressure after each tire testing step concerning a particular section of the tire.

Finally it is an advantage if two sets of rollers are provided for the simultaneous testing of the tires on the front wheels and, respectively, rear wheels of a motor vehicle, and it is more especially advantageous if the roller sets of a brake-testing stand are employed, and the drive control of the sets of rollers of the brake-testing stand are so designed that the rollers are able to be incrementally rotated by given amounts. According to this embodiment of the invention, the motor of the brake-testing stand is not only used for rotating the wheel during the brake-testing procedure, but also to incrementally rotate the wheel during the tire testing procedure. The problem of this solution is that the motor of the brake-testing stand is normally designed as a strong motor to provide enough traction to the wheel to perform the brake-testing procedure. In the brake-testing procedure, the wheel is driven to a particular maximum speed, then the brakes are applied to the wheel to slow down or stop the rollers driven by the motor. The motor control necessary for such a procedure is not adapted to rotate the wheel on the brake-testing stand at slow speed let alone to control the rotation incrementally. Therefore, an adapted motor control method and apparatus is necessary in order to adapt the brake-testing stand of the state of art to the present purpose. In other words, in combining the tire tester known from the German patent application 42 31 578 A1 and a brake-testing stand of the state of art into one single machine, certain changes and provisions have to be made to make such a combination possible. In spite of the specialized motor control required for the machine, a combination machine as envisioned in the present application has distinct advantages over the state of art as to cost and performance.

The tire testing apparatus of the invention comprises an air pressure means for altering the tire pressure, a test head and a computer, which before and after an alteration in the air pressure produce, using coherent radiation, a respective interferogram of the tire surface and convert the interferogram into a modulo 2 π image, which on for its part is processed to yield a gray value image, and in which on the basis of a comparison of the gray value images information concerning any defects in the tire is obtained and the apparatus is characterized by at least one driven roller set onto which the motor vehicle with the tires to be examined may be driven, a positioning means for the test head, with which the test head is to be moved up to a predetermined distance from the tire for producing the interferograms, and by a control means for the roller set in order to incrementally rotate the wheel by an amount corresponding to a test segment, when the examination of the preceding test segment is concluded.

An advantageous further development of the apparatus of the invention is characterized in that the motor is adapted to be operated by means of a frequency converter, which is adapted to be controlled by a computer. This is a most reliable way of controlling the motor of the brake-testing stand such that it incrementally moves the wheel at a low speed during the tire testing procedure.

An advantageous further development of the apparatus of the invention is characterized by a feeler roller, which is responsive to incremental rotation of the tire and via a synchro to supply a corresponding signal to the computer, which switches off the motor drive, when the wheel has been rotated incrementally through one further test segment. By using this arrangement, a feedback relating to the incremental movement of the wheel may be produced and used to exactly control the incremental movement of the wheel on the brake testing stand.

An advantageous further development of the apparatus of the invention is characterized in that the computer comprises a memory, wherein a table is provided with size data, as is necessary for the incremental rotation of a wheel in a manner dependent on the size of the wheel. The memory in the computer ensures that as little expert knowledge as possible is necessary to run the machine.

An advantageous further development of the apparatus of the invention is characterized in that the positioning means comprises an X slide for shifting said test head in a direction perpendicular to the axes of the rollers, a Y slide for shifting said test head in a direction in parallelism to the axes of the rollers, and a Z slide for shifting said test head perpendicularly to the axes of the rollers, perpendicularly to the supporting surface and at 90° to the Z slide. These positioning means provide for an accurate movement of the test head with respect to the tire.

An advantageous further development of the apparatus of the invention is characterized in that the positioning means comprises a Z column and two parallel guides and, respectively, two pivot arms. These mechanical positioning means are easily operable and strong enough for the hazardous environment in automobile service stations and the like.

An advantageous further development of the apparatus of the invention is characterized in that the positioning means may be arrested, when the test head has reached the test position to ensure well defined conditions during the measurements.

An advantageous further development of the apparatus of the invention is characterized by a handle with which the test head may be brought into a test position to improve easy handling of the apparatus.

An advantageous further development of the apparatus of the invention is characterized by press button switch for causing the positioning means to be arrested, said control button being more particularly arranged in the vicinity of the handle for convenience of operation.

An advantageous embodiment of the tire testing apparatus of the invention is characterized by a distance setting device for setting the distance between the test head and the tire. Preferably, the distance setting device comprises two obliquely set diodes on the end of the test head, the beams from such diodes intersecting at the test distance. This distance setting device allows a setting of the distance without touching the wire by optical means. The distance setting device can be operated easily.

An advantageous embodiment of the tire testing apparatus of the invention is characterized in that the distance setting device comprises a mechanical feeler on the test head, which feeler on reaching the test distance contacts the tire. This is a mechanical version of the distance setting device which is simple and adapted to the rough environment.

An advantageous embodiment of the tire testing apparatus of the invention is characterized in that the distance setting device comprises an ultrasonic range finding means. This distance setting device is another device which does not need to touch the wire which is advantageous also if the surface which is accessible has some profile.

An advantageous embodiment of the tire testing apparatus of the invention is characterized by valve which is able to be set both as regards the size of its opening and also as regards the time of opening. Such a valve enables a quick and automatic setting of the tire pressure under the control of a computer which only controls the size of the valve opening and the opening time of the valve. This also has an advantage in view of minimizing the time needed for carrying out a complete testing cycle.

An advantageous further development of the apparatus of the invention is characterized in that the air pressure means is integrated in the test head so as to protect this part of the apparatus.

An advantageous further development of the apparatus of the invention is characterized in that the air pressure means is adapted to so control the air pressure of the said tire that for each test step the tire pressure is reduced by one step and after conclusion of testing is returned to the nominal pressure again. As already mentioned above, this minimizes also the time needed for carrying out a complete testing process cycle.

An advantageous further development of the apparatus of the invention is characterized by two roller sets and two positioning means with test heads. Preferably, the units comprising positioning means and a test head are associated with the roller sets of a brake-testing stand. Accordingly the testing of the tire is integrated in brake testing, something which offers advantages both as regards costs and also as regards the price of the equipment.

An advantageous further development of the apparatus of the invention is characterized by a central computing means for control of the functions of the tire testing apparatus, the computing means preferably being integrated with the computing means of the brake-testing stand. By combining the computing means of the testing apparatus with the computing means of the brake-testing stand, some savings in respect to the hardware required can be made, which reduces the costs and improves reliability.

An advantageous further development of the apparatus of the invention is characterized by a monitor for display of the results of measurement, and which also serves for display of information in relation to brake testing. This is another hardware sharing system for reducing costs.

A further understanding of the nature and advantages of the present invention may be realized by reference to the remaining portions of the specification and the drawings.

BRIEF DESCRIPTION OF THE DRAWINGS

FIG. 1 diagrammatically shows in plan view a tire testing apparatus in accordance with a first embodiment of the invention using the roller sets of a brake-testing stand.

FIG. 2 shows a partially diagrammatic plan view of a further embodiment of the tire testing apparatus of the invention of FIG. 1.

FIG. 3 shows a diagrammatic plan view of part of a further embodiment of the tire testing apparatus in accordance with the present invention.

FIG. 4 shows a diagrammatic plan view of part of a further embodiment of the tire testing apparatus in accordance with the present invention.

FIG. 5 shows a diagrammatic lateral elevation of the working embodiment in accordance with FIG. 4.

FIG. 6 shows a lateral elevation of the working embodiment of FIG. 4.

DESCRIPTION OF THE SPECIFIC EMBODIMENTS

Referring to FIGS. 1 and 2 a first embodiment of the tire testing apparatus of the invention will be described. A brake-testing stand 2 will be seen to comprise roller sets 4 and 6 and, respectively, 8 and 10, of which each single roller 4 and 10 is driven by a motor 12 and 14. The respectively other roller 6 and 8 freewheels. Between the rollers 4 and 6 and, respectively, 8 and 10 of the sets there is a respective feeler roller 16 and, respectively, 18. The roller sets and drive motors are arranged in a well 20 in the floor.

A vehicle is driven in the direction of the arrow F on to the roller sets so that for instance its front wheels are arranged on the two sets of rollers. FIGS. 1 and 2 show a front wheel 22 of a motor vehicle, whose tires are to be tested or examined. FIG. 1 furthermore shows a front wheel 24, which possesses a smaller diameter than the wheel 22 and belongs to another motor vehicle. The different sizes of the wheels 22 and 24 are only assumed for the explanation of the manner of functioning of this working embodiment of the invention.

In FIG. 1 two positioning means 30 and 32 with control means 34 and 36 and also test heads 38 and 40 are illustrated. The positioning means 30 possesses an X slide 42, a Y slide 44 and a Z slide 46. The Y slide 44 serves for setting the distance between the test head 38 and the lateral surface of the tire 22, whereas the Z slide 46 renders it possible to set the middle of the test head to the level of the axle of wheels of different sizes. In the illustrated working embodiment the X direction of the X slide 42 is perpendicular to the axes of the rollers 4 and 6, the Y direction of the Y slide is parallel to the axes of the rollers 4 and 6 and the Z slide axis is perpendicular to the axes of the rollers 4 and 6, perpendicular to the supporting surface and at 90° to the X direction.

The X slide 42 and the Y slide 44 are supported by means of linear bearings 48 and, respectively, 50 with shaft guides and the Z slide 46 is movingly supported by means of linear bearings 52, 54, 56 and 58 on guide columns 60 and 62. The X slide 42, the Y slide 44 and the Z slide 46 are respectively provided with clamping means (not illustrated) rendering it possible for the slides to be arrested in a test position, wherein the test head 38 is located in a position for the tire testing operation to be performed.

The control means 34 possesses the controller for the air pressure means, which comprises a pressure hose 64 and a valve 66, which may be connected with the inlet valve of the tire. The valve 66 is able to be set both as regards its aperture (setting the discharge rate) and also for opening and closing so that the pressure alteration in the tire may be set both using the valve opening setting and also using the time for which the valve is opened.

A handle 35 is provided on the control means 34, with which the control means 34 and the test head 38 may be moved manually along the three axes until the test position is reached. When the test position is arrived at, the arresting means for the three slides are activated using a press button switch 37, which is provided on the handle 35.

The test head 38 arranged on the Z slide 46 is represented in FIG. 2 in an end-on view and laser diodes 68 will be seen for interferograms. Furthermore two diodes 70 and 72 are provided, which serve to ascertain the correct distance between the test head 38 and the side wall of the tire 22. For this purpose the two laser diodes 70 and 72 are so set obliquely in the visible range that their laser beams make an angle with one another and intersect at the point corresponding to the correct distance between the test head and the tire's side surface. When the test head 38 is shifted using the slide toward the tire 22, it will be at the test distance when the two laser beams form a single point on the side wall of the tire 22. Finally the figure diagrammatically shows an objective 73 of a camera, which takes pictures of the tire being tested.

The speed of rotation of the motors 12 and 14 is so controlled via a controlled frequency converter (not illustrated) by the central computer unit of the tire testing apparatus that such speed is at a relatively low, constant value. The feeler rollers 16 and 18 sense the tire in order to produce a signal via synchros, which is equal to the amount by which the tire has been rotated. In the computer the output signal from the synchros is utilized to turn off the drive motor when the tire has been turned incrementally by an amount corresponding to the size of a test segment. In the case of the embodiment depicted in FIG. 2 a test segment is equal to 1/8 of the total periphery of the tire so that the tire must be turned through seven further steps or increments in order to check the tire completely.

Leads for compressed air, for electrical power supply to the test head and a data line leading to the computer unit are connected with the control means 34 and the test head 38. Furthermore the motors 12 and 14 and the synchros of the feeler rollers 16 and 18 are connected with the computer unit, neither such connection lines nor the computer unit being illustrated in order to make the drawing more straightforward.

In FIG. 3 a further embodiment of the tire testing apparatus will be seen, parts equivalent to those of FIGS. 1 and 2 having the same reference numerals.

In this embodiment the control means is integrated in the test head 74 and the test head is connected via two parallel guides 76 and 78 with a Z column 80. The test head 74 is, as has been described supra, brought into position with the aid of the handle 35, and then the two parallel guides 76 and 78 and furthermore the column 80 are arrested as in the preceding embodiment. As shown in FIG. 3, with this positioning means it is possible to move the test head 74 as far as the test distance apart both in the case of large wheels like the wheel 22 and also in the case of small wheels like the wheel 24, as is indicated in phantom lines.

FIGS. 4 through 6 show a further embodiment of the tire testing apparatus of the invention, parts equivalent to those of the preceding figures bearing the same reference numerals. The departure from the working embodiment of FIG. 3 in FIG. 4 is that instead of the parallel guides 76 and 78 in FIG. 3 pivot arms 82 and 84 are employed. This is a further way of readily bringing the test head 74 into the position wherein the correct distance from the side surfaces of the tire 22 is maintained. Then the pivot arms 82 and 84 and also the Z column 80 are arrested.

In all embodiments of the invention a central computer means is provided for control of the functions of the tire testing apparatus, such computer means being integrated in the computer of the brake-testing stand so that here as well hardware complexity is reduced. Furthermore the monitor for indicating the measurement readings is also employed for the testing of the tires to the extent that the information relevant to the two test methods is displayed on the same monitor.

The manner of operation of the working examples as described of the tire testing apparatus of the invention is as follows:

Firstly the vehicle is so driven onto the two roller sets of a brake-testing stand that its front wheels bearing the tires to be tested rest thereon, the driven rollers being able to be run at different speeds, under computer control both for performing the brake examination and also for performing the tire test.

The next step is for a respective test head to be moved up to the tire so as to be at a predetermined distance therefrom for producing the interferogram and arrested in such position.

After driving the vehicle onto the roller sets the air pressure valves are connected with the tires.

Previous to performing the test first sequence the data specific to the wheel and, respectively, the size data for incremental rotation of the roller set, as for example the duration of driving at a constant speed of rotation, which are dependent on the wheel dimensions, are supplied to the computer as an input or, respectively, looked up in a table.

Then the examination of the tire is performed on a first tire segment thereof using the initially mentioned method. After the first test segment has been tested, the wheel is rotated by the roller set by a step equal to the size of a test segment, the driven rollers of the sets being controlled via a computer and in a manner dependent on the output signals of a feeler roller synchro. When the wheel's next test segment has been brought into position, a quiescent time is allowed to elapse to ensure that measurement is not affected by tire creep after incremental rotation and it is only after such quiescent time and further rotation of the tire that the test head is activated in order to test the next segment.

Thereafter test sequences and incremental further steps in rotation of the wheels are performed until the entire tire has been tested. For each test sequence, as already mentioned, between a first series of interferograms and a second series of interferograms the pressure is reduced, this also being controlled by the computer means. The reduction in pressure hence occurs in stages, the pressure being reduced in each test sequence by one step. Once the test has been concluded the air pressure in the tire is then returned to the pressurized state, the valve and the control means connected therewith also being employed.

Once the testing of the front wheels has been concluded, the vehicle is moved so that its rear wheels are on the roller sets and the test procedure is repeated for the rear wheels. Accordingly the examination of the wheels on all four wheels of the vehicle is then completed.

Certain modifications are possible in the working examples of the invention without leaving the scope of the invention. For instance the positioning means may possess carriages with rollers with which the test heads may be moved up to the wheels. The adjustment of the distance between the test head and the wheel may be performed mechanically using a feeler on the test head, which on reaching the desired test distance engages the tire or an ultrasonic range finding means may be employed. It would be feasible to provide only roller sets intended for tire testing or for the front axle and rear axle wheels to be examined simultaneously.

It is to be understood that the above description is intended to be illustrative and not restrictive. Many embodiments will be apparent to those skilled in the art upon reviewing the above description. Those skilled in the art will recognize as an equivalent or alternative method of tire testing and combining a tire testing machine with a wheel balancing machine. The scope of the invention should, therefore, be determined not as reference to the above description, but should instead be determined with reference to the apended claims along with the full scope of equivalence to which such claims are entitled.

What is claimed is:

1. A method of testing tires, wherein before and after an alteration in the tire pressure a respective interferogram is produced of the tire surface using coherent radiation and the interferogram is converted into a modulo 2 π image, which for its part is processed to obtain a gray value image and in the case of which from a comparison of the gray value images information concerning any defects present in the tire is obtained, wherein for testing the tire on a motor vehicle (a) the motor vehicle with the wheel mounting the tire to be examined is driven so that such tire is on a motor driven roller set (b) a test head arranged to produce interferograms is moved up to the tire to be at a predetermined distance therefrom, (c) the checking of the tire for defects is performed on a first test segment of the tire, (d) the wheel is further rotated by the roller set by an amount equal to a test segment, and (e) and the steps (c) and (d) are repeated until the entire tire has been examined.

2. The method as claimed in claim 1, wherein between incremental rotation of the wheel and activation of the test head for testing a test segment a quiescent recovery time of predetermined duration is allowed to elapse.

3. The method as claimed in claim 1, wherein the drive motor of the roller set is operated using a computer via a controllable frequency converter.

4. The method as claimed in claim 3, wherein the further rotation of the motor is sensed and a corresponding input signal fed to the computer.

5. The method as claimed in claim 4, wherein the size data, for further incremental rotation of the wheel are communicated to the computer or are looked up from a table in the computer.

6. The method as claimed in claim 1, wherein the test head is moved in the X, Y and Z directions in order to bring same into the test position for different sized tires.

7. The method as claimed in claim 1, wherein when moving said test head toward said tire the distance of the test head from the tire is monitored and a signal is displayed when the test head has reached the test distance and in that the test head is then arrested.

8. The method as claimed in claim 1, wherein the tire pressure is reduced by one pressure step for each test step and after testing has been completed it is returned to the nominal pressure.

9. The method as claimed in claim 1, having two roller sets for the simultaneous testing of the tires of the front and rear wheels of a vehicle.

10. The method as claimed in claim 1, wherein the roller sets of a brake-testing stand are employed, the drive control for the roller sets of the brake-testing stand being adapted for the rollers to be incrementally further rotated by predetermined amounts.

11. A tire testing apparatus comprising:

an air pressure means for altering tire pressure, a test head and a computer, which before and after an alteration in the air pressure, using coherent radiation, produce a respective interferogram of the tire surface and convert the interferogram into a modulo 2 π image, which for its part is processed to yield a gray value image, and in which on the basis of the gray value images information concerning any defects in the tire is obtained, a motor-driven roller set on which the wheel with the tire to be tested thereon may be arranged by driving a vehicle having mounted such wheel, a positioning means for the test head, with which the test head is to be moved up to a predetermined distance from the tire for producing the interferograms, and a control means for the motor of the roller set in order to incrementally rotate the wheel by an amount corresponding to a test segment, when the examination of the preceding test segment is concluded.

12. The apparatus as claimed in claim 11, wherein the air pressure means is integrated in the test head.

13. The apparatus as claimed in claim 11, wherein the air pressure means is adapted to so control the air pressure of the said tire that for each test step the tire pressure is reduced by one step and after conclusion of testing is returned to the nominal pressure again.

14. The apparatus as claimed in claim 11, wherein the motor is adapted to be operated by means of a frequency converter, which is adapted to be controlled by a computer.

15. The apparatus as claimed in claim 11, having a feeler roller, which is responsive to incremental rotation of the tire and via a synchro to supply a corresponding signal to the computer, which switches off the motor drive, when the wheel has been rotated incrementally through one further test segment.

16. The apparatus as claimed in claim 15, wherein the computer comprises a memory, wherein a table is provided with size data, as is necessary for the incremental rotation of a wheel in a manner dependent on the size of the wheel.

17. The apparatus as claimed in claim 11, wherein the positioning means comprises an X slide for shifting said test head in a direction perpendicular to the axes of the rollers, a Y slide for shifting said test head in a direction in parallelism to the axes of the rollers, and a Z slide for shifting said test head perpendicularly to the axes of the rollers and perpendicularly to the direction of said X slide.

18. The apparatus as claimed in claim 17, wherein the positioning means may be arrested, when the test head has reached the test position.

19. The apparatus as claimed in claim 17, having a handle with which the test head may be brought into a test position.

20. The apparatus as claimed in claim 17, having press button switch for causing the positioning means to be arrested.

21. The apparatus as claimed in claim 11, wherein the positioning means comprises a Z column and two parallel guides and, respectively, two pivot arms.

22. The apparatus as claimed in claim 21, wherein the positioning means may be arrested, when the test head has reached the test position.

23. The apparatus as claimed in claim 21, having a handle with which the test head may be brought into a test position.

24. The apparatus as claimed in claim 21, having press button switch for causing the positioning means to be arrested.

25. The apparatus as claimed in claim 11, having a distance setting device for setting the distance between the test head and the tire.

26. The apparatus as claimed in claim 25, wherein the distance setting device comprises two obliquely set diodes on the end of the test head, the beams from such diodes intersecting at the test distance.

27. The apparatus as claimed in claim 25, wherein the distance setting device comprises a mechanical feeler on the test head, which feeler on reaching the test distance contacts the tire.

28. The apparatus as claimed in claim 25, wherein the distance setting device comprises an ultrasonic range finding means.

29. The apparatus as claimed in claim 11, having a valve which is able to be set both as regards the size of its opening and also as regards the time of opening.

30. The apparatus as claimed in claim 29, wherein the air pressure means is integrated in the test head.

31. The apparatus as claimed in claim 29, wherein the air pressure means is adapted to so control the air pressure of the said tire that for each test step the tire pressure is reduced by one step and after conclusion of testing is returned to the nominal pressure again.

32. The apparatus as claimed in claim 11, having two roller sets and two positioning means with test heads.

33. The apparatus as claimed in any one of the claims 11, wherein units comprising positioning means and a test head are associated with the roller sets of a brake-testing stand.

34. The apparatus as claimed in claim 11, having a central computing means for control of the functions of the tire testing apparatus, the computing means preferably being integrated with the computing means of the brake-testing stand.

35. The apparatus as claimed in claim 11, having a monitor for display of the results of measurement, and which also serves for display of information in relation to brake testing.

* * * * *